(12) United States Patent
Hurst

(10) Patent No.: US 10,113,664 B2
(45) Date of Patent: Oct. 30, 2018

(54) CONTROL VALVE FOR CONTROLLING A FLUID FLOW

(71) Applicant: Schaeffler Technologies AG & Co. KG, Herzogenaurach (DE)

(72) Inventor: Sebastian Hurst, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/538,096

(22) PCT Filed: Apr. 7, 2016

(86) PCT No.: PCT/DE2016/200173
§ 371 (c)(1),
(2) Date: Jun. 20, 2017

(87) PCT Pub. No.: WO2016/173592
PCT Pub. Date: Nov. 3, 2016

(65) Prior Publication Data
US 2018/0017183 A1 Jan. 18, 2018

(30) Foreign Application Priority Data
Apr. 27, 2015 (DE) .......................... 10 2015 207 619

(51) Int. Cl.
*F16K 39/06* (2006.01)
*F16K 5/20* (2006.01)
(Continued)

(52) U.S. Cl.
CPC ............ *F16K 39/06* (2013.01); *F16K 5/0605* (2013.01); *F16K 5/0689* (2013.01); *F16K 5/202* (2013.01);
(Continued)

(58) Field of Classification Search
CPC ...... F16K 39/06; F16K 5/0689; F16K 5/0605; F16K 5/202; F16K 5/204; F16K 5/20;
(Continued)

(56) References Cited

U.S. PATENT DOCUMENTS 2,876,987 A * 3/1959 Renfro ................. F16K 41/046
251/214
3,064,937 A * 11/1962 Pryor ........................ F16K 5/14
251/163
(Continued)

FOREIGN PATENT DOCUMENTS

DE 2556729 7/1976
DE 2818935 11/1978
(Continued)

*Primary Examiner* — John Bastianelli
(74) *Attorney, Agent, or Firm* — Volpe and Koenig, P.C.

(57) ABSTRACT

A control valve for controlling a fluid flow is disclosed, in particular a coolant flow in a coolant circuit of an internal combustion engine, including a valve element which is provided with at least one opening, and which can move relative to a valve housing. With a movement of the valve element, the at least one opening can be brought into a position in which it overlaps a line cross-section defined on the valve housing side, in order to permit a flow of fluid. In addition, a sealing element is provided which is accommodated on the valve housing such that it radially surrounds the line cross-section, and a sealing surface of which can be brought into contact with a surface of the valve element, thus bridging a gap that extends between the surface of the valve element and the valve housing in a region of the sealing element. In order to provide a control valve that has minimal friction losses over the working range thereof, the extent of the gap changes according to the movement of the valve element in relation to the valve housing. In addition, the extent of the gap reaches a maximum in a region in which the at least one opening overlaps the line cross-section, at
(Continued)

which extent the sealing element with its sealing surface is raised from the surface of the valve element.

11 Claims, 2 Drawing Sheets

(51) Int. Cl.
  *F16K 5/06* (2006.01)
  *F01P 7/14* (2006.01)
  *F01M 1/16* (2006.01)
(52) U.S. Cl.
  CPC .................. *F01M 1/16* (2013.01); *F01P 7/14* (2013.01); *F01P 2007/146* (2013.01)
(58) Field of Classification Search
  CPC ....... F16K 5/201; F01P 7/14; F01P 2007/146; F01M 1/16
  USPC .............. 251/163–164, 174, 315.01–315.16, 251/309–312
  See application file for complete search history.

(56) References Cited

U.S. PATENT DOCUMENTS

| | | | | |
|---|---|---|---|---|
| 3,124,333 A | * | 3/1964 | Sivyer | F16K 5/204 251/163 |
| 3,410,523 A | * | 11/1968 | Kelly | F16K 5/0668 251/163 |
| 3,484,078 A | * | 12/1969 | Haenky | F16K 5/204 251/163 |
| 4,029,292 A | * | 6/1977 | Kramer | F16K 5/204 251/163 |
| 4,269,391 A | | 5/1981 | Saito et al. | |
| 4,410,165 A | * | 10/1983 | Koch | F16K 5/0673 251/174 |
| 4,635,675 A | * | 1/1987 | Walter | F16K 5/201 137/315.21 |
| 4,936,547 A | * | 6/1990 | Obst | F16K 5/204 251/304 |
| 5,253,843 A | * | 10/1993 | Garceau | F16K 5/201 251/159 |
| 6,681,793 B2 | * | 1/2004 | Mike | F16K 5/201 137/15.22 |
| 6,974,121 B2 | * | 12/2005 | Koester | F16K 5/204 251/174 |
| 7,775,502 B2 | * | 8/2010 | Ohta | F16K 27/067 251/163 |

FOREIGN PATENT DOCUMENTS

| | | |
|---|---|---|
| DE | 10124323 | 12/2002 |
| DE | 102009025360 | 12/2010 |
| DE | 102010026368 | 1/2012 |
| EP | 0547381 | 6/1993 |
| EP | 1258662 | 11/2002 |
| GB | 2352494 | 1/2001 |

* cited by examiner

CONTROL VALVE FOR CONTROLLING A FLUID FLOW

BACKGROUND

The invention relates to a control valve for controlling a fluid flow, in particular, a coolant flow in a coolant circuit of an internal combustion engine, comprising a valve element that is equipped with at least one opening and can be moved relative to a valve housing, wherein the opening can be made to overlap with a line cross section defined by the valve housing by moving the valve element, in order to enable a flow of fluid, and wherein a sealing element is provided that is held on the valve housing radially surrounding the line cross section and can be brought into contact on a sealing surface with a surface of the valve element while bridging a gap that extends between the surface of the valve element and the valve housing in the area of the sealing element.

DE 10 2009 025 360 A1 discloses a control valve that comprises a valve element with an opening, wherein this valve element can be moved perpendicular to a valve housing. Here, this valve element can be moved with its opening through corresponding displacement so that it overlaps a line cross section of the valve housing, in order to enable a flow of fluid out of the line cross section. In the area of the line cross section, the valve housing is also provided with a sealing element that presses with a sealing surface against a surface of the valve element and here seals a gap extending between the surface of the valve element and the valve housing.

Other stop or rotary slide valves are known from DE 101 24 323 C1, DE 10 2010 026 368 A1, EP 0 547 381 A1, DE 25 56 729 C2, DE 28 18 935 A1, and GB 2 352 494 B.

SUMMARY

Starting from the prior art described above, the objective of the present invention is now to create a control valve that distinguishes itself by its working range through the lowest possible friction losses.

This objective is achieved starting from the preamble in connection with its characterizing features. The dependent claims give advantageous refinements of the invention.

According to the invention, a control valve comprises a valve element that is equipped with at least one opening and can be moved relative to a valve housing. Here, the opening can be brought into overlap with a line cross section defined by the valve housing by moving the valve element, in order to enable a flow of fluid. A sealing element is also provided that is held on the valve housing radially surrounding the line cross section and can be brought into contact on a sealing surface with a surface of the valve element while bridging a gap, wherein the gap extends between the surface of the valve element and the valve housing in the area of the sealing element.

The respective fluid flow is controlled by the control valve through corresponding positioning of the opening relative to the line cross section, because the fluid can flow through the valve element via the opening only after the opening overlaps with the line cross section. A volume flow of fluid is here controlled by the degree of overlap of the opening with the line cross section, wherein a maximum volume flow can be presented by the valve element with complete release of the line cross section. The line cross section can be a supply or also a discharge for a fluid in the area of the control valve. The fluid can flow out via the opening starting when the opening overlaps with the line cross section or flow into the line cross section via the opening. In particular, in the last case, a discharge can also branch off to more lines.

The sealing element is held by the valve housing and encloses the line cross section radially, i.e., the sealing element surrounds the line cross section perpendicular to a flow direction of the fluid, in order to seal an opening of the line cross section for contact of the sealing element against the surface of the valve element accordingly relative to its environment. In this respect, the sealing element is preferably constructed as an annular or hollow cylindrical seal that can move in contact with a circular sealing surface on the surface of the valve element. The sealing is here realized in that the sealing element bridges a gap that prevails between the surface of the valve element and the valve housing in the area of the sealing element and would otherwise allow an undesired supply or discharge of fluid.

The valve element can be moved selectively with respect to the valve housing for setting the overlap of the opening with the line cross section. This movement can here be provided as a translational or else also as a rotational movement, wherein the valve element is then constructed in the latter case preferably with a ball-like surface.

The control valve is preferably part of a coolant circuit of an internal combustion engine and is used here for distributing a provided volume flow of coolant to the relevant heat sources and sinks. Alternatively, a control valve according to the invention could also be used in an oil circuit of an internal combustion engine or else also in a different industrial field, for example, in the field of airplanes, agricultural machines, stationary appliances, etc.

The invention now includes the technical teaching that the extent of the gap changes as a function of the movement of the valve element relative to the valve housing and that the gap reaches its maximum extent in the area of the overlap of the opening with the line cross section at which the sealing element is lifted with its sealing surface from the surface of the valve element. In other words, a distance between the surface of the valve element and the valve housing varies in the area of the sealing element according to the position of the opening relative to the line cross section, wherein, in the area of an overlap, a maximum distance prevails between the valve housing and surface of the valve element at which maximum distance the sealing element is no longer in contact at its sealing surface with the surface of the valve element.

Such a construction of a control valve has the advantage that if the sealing element does not contact the surface of the valve element, there are no friction losses when the valve element moves, which would otherwise be caused by the sliding of the sealing element on the surface of the valve element. In this respect, friction moments occurring over the working range of the control valve can be reduced overall, which improves the efficiency of the control valve accordingly. Therefore, because the lifting of the sealing element from the surface of the valve element is arranged in the area of the overlap of the opening with the line cross section at which a supply or discharge of fluid into or out of the line cross section is desired, the resulting lack of sealing by the sealing element does not cause any problems. The reduction of friction torques is thus arranged selectively in a movement range of the valve element relative to the valve housing in which there is no sealing by the sealing element.

In contrast, in the case of DE 10 2009 025 360 A1, the sealing element is permanently in contact with its sealing surface on the surface of the valve element, so that for the transverse movement of the valve element relative to the valve housing, a certain friction always occurs due to the contact between the sealing element and valve element. Accordingly, friction losses of this control valve are increased viewed over the working range.

For the invention, it is essential that an extent of the gap changes as a function of the movement of the valve element relative to the valve housing, wherein the extent reaches its maximum value in the area of the overlap of the opening and line cross section at which the sealing element can no longer contact the surface of the valve element. Away from the overlap, the gap has an extent for which the sealing element contacts with its sealing surface on the surface of the valve element and thus provides a sealing effect.

According to one embodiment of the invention, the changing of the extent of the gap is implemented by a non-uniform construction of the surface of the valve element, in that on a base body of the valve element away from the opening, an additional contour increasing a dimension of the valve element in the direction of the valve housing is set up. The variation of the gap set between the valve housing and valve element is thus realized on the side of the valve element by a corresponding construction of the surface.

According to another possible construction of the invention, the surface of the valve element is constructed as a ball surface or as part of a ball surface. As a refinement of this construction in combination with the previous embodiment, the base body is then provided as a first ball or as part of a first ball on which the contour is set up in the form of a part of a second ball. In this way, the changing surface of the valve element can be realized in a reliable way. The cutting out of the contour in the area of the opening can be realized by corresponding mechanical processing of a ball-shaped base body.

In another embodiment of the invention, transitions are formed between different dimensions of the valve element in the direction of the valve housing by ramps. In this way, a corresponding transition can be created, so that a tilting and clamping of the sealing element is reliably prevented when changing between the contact on the valve element and the lifting from the valve element.

According to another possible construction of the invention, the line cross section is defined by a fitting of the valve housing. Here, this fitting acts as a supply or discharge for the fluid. In a refinement of the previously mentioned possible construction, the fitting and another part of the valve housing define an intermediate space that holds a spring element that pre-tensions the sealing element in the direction of the valve element. Here, a mechanical stop for the sealing element is also provided that prevents the sealing element from contacting the surface when the gap is at its maximum extent. By use of the spring element, away from the overlap of the opening and line cross section there is always a reliable contact and thus sealing of the sealing element on the valve element, wherein when the gap is at its maximum extent, the sealing element is prevented by the stop from further displacement in the direction of the surface and the contact at that position.

According to the invention, the opening in the valve element is preferably constructed as an elongated hole so that a corresponding overlap area can be defined in the course of the movement of the valve element relative to the valve housing. In refinement of the invention, the ramps on each of the two sides of the elongated hole are provided, wherein ramps decreasing to a smaller dimension of the valve element run starting from the beginning of an overlap of the elongated hole with the line cross section up to complete release of the line cross section, while ramps increasing to a larger dimension of the valve element run starting at the end of the complete release of the line cross section through the elongated hole up to the end of the overlap of the elongated hole with the line cross section. In this way, suitable transitions are created for lifting the sealing element from the surface of the valve element and also subsequently reestablishing its contact.

According to the invention, an overlap area of the opening with the line cross section in the direction of movement of the valve element relative to the valve housing should be sufficiently large so that a corresponding area is set in the course of the movement of the valve element relative to the valve housing in which the sealing element is lifted from the surface.

BRIEF DESCRIPTION OF THE DRAWINGS

An advantageous embodiment of the invention, explained below, is shown in the drawings. Shown are.

DETAILED DESCRIPTION OF THE PREFERRED EMBODIMENTS

Figure 1:
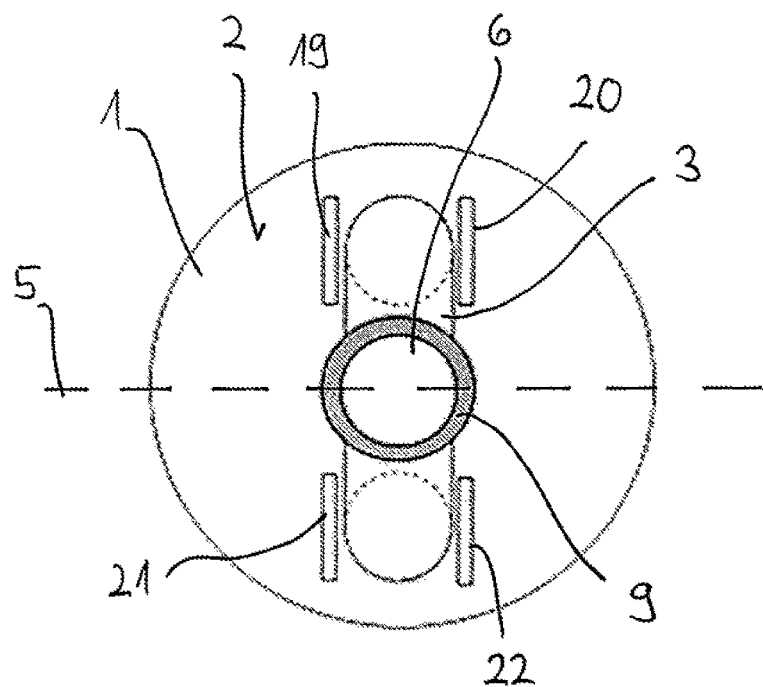
FIG. 1 a schematic top view of a control valve.

FIG. 1 how a schematic top view of a control valve that is used for controlling a fluid flow. Here, this control valve is designed, in particular, for use in a coolant circuit of an internal combustion engine, in order to completely or also only partially throttle a volume flow of coolant or to distribute this volume flow of coolant to the relevant heat sources and sinks. In general, the control valve according to the invention can also be used in other fluid circuits, for example, an oil circuit of an internal combustion engine.

As can be seen, the control valve comprises a valve element 1 that is equipped with a ball-like surface 2 that is penetrated in one area with an opening in the form of an elongated hole 3. By use of the elongated hole 3, an area surrounding the valve element 1 is connected to an inner area of the valve element 1 that cannot be seen in the present case and can be supplied with fluid. In this respect, the inner area of the valve element 1 acts as a supply for fluid.

Figure 2:
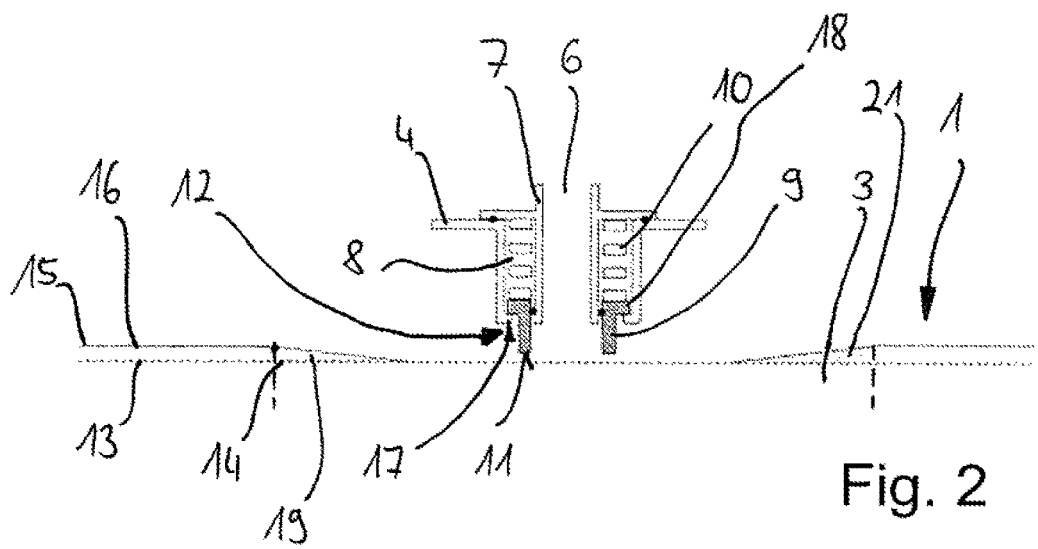
FIG. 2 a schematic sectional representation of the control valve from FIG. 1 with modified circumference of a valve element, and FIG. 3 another sectional representation of the control valve of the invention, shown in a position deviating from that of FIGS. 1 and 2.
Figure 3:
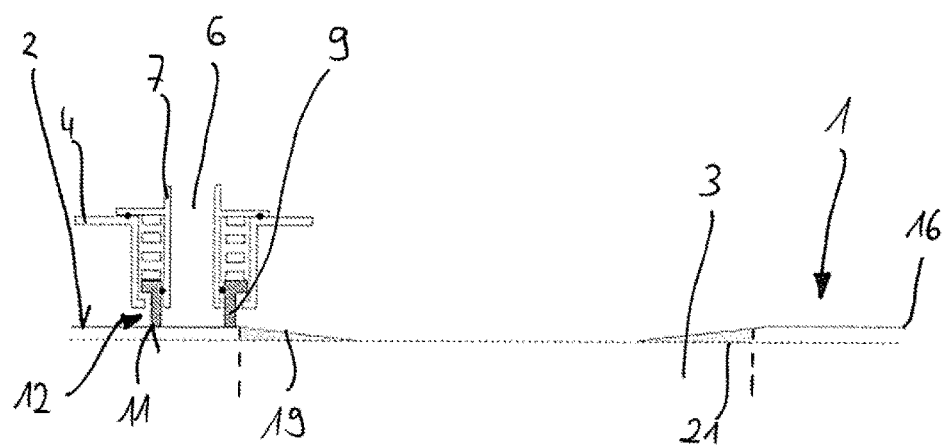

The valve element 1 can be moved by corresponding actuation relative to a valve housing 4 to be seen in FIGS. 2 and 3, in that the valve element 1 is rotated about a rotational axis 5 shown in FIG. 1. Corresponding to the movement of the valve element 1 relative to the valve housing 4, the elongated hole 3 is brought into overlap with a line cross section 6 that is defined by a fitting 7 of the valve housing 4 and forms a discharge for the fluid. The fitting 7 is to be seen in FIGS. 2 and 3.

As can be seen in FIG. 2 and also in FIG. 3, the fitting 7 and the other part of the valve housing 4 enclose an intermediate space 8 in which a hollow cylindrical sealing element 9 is guided so that it can move. The sealing element 9 surrounds the line cross section 6 radially and is pre-tensioned in the direction of the surface of the valve element 1 by a spring element 10 similarly held in the space 8. If the sealing element 9 with an annular sealing surface 11 contacts the surface 2 of the valve element 1, the transition of the line cross section 6 to the valve element 1 is sealed relative to a gap 12 that prevails between the surface 2 of the valve element 1 and the valve housing 4 in the area of the sealing element 9.

As a special feature, the surface 2 of the valve element 1 is now shaped non-uniformly, as can be seen with reference to FIG. 2 and also FIG. 3, in each of which a circumference of the surface 2 is shown modified. This is achieved in that a contour 15 is set up on a ball-shaped base body 14 defining a first dimension 13, wherein this contour defines a second dimension 16 and is provided as part of another ball. Here, the contour 15 is cut out in the area of the elongated hole 3, so that the surface in the area of the elongated hole 3 is reduced from the dimension 16 to the dimension 13. This also results in a corresponding change of the gap 12 for each positioning of the valve element 1 with its surface 2 relative to the valve housing 4.

In FIGS. 1 and 2, the valve element 1 is brought into a position relative to the valve housing 4 in which the line cross section 6 completely overlaps with the elongated hole 3. In this position, a complete fluid flow between the supply and discharge should take place, so that in this area a sealing of the gap 12 by the sealing element 9 is not necessary. To keep the friction between the valve element 1 and the valve housing 4 in the course of a movement of the valve element 1 as low as possible in this area, the sealing element 9 is prevented from contacting its sealing surface 11 on the surface 2 of the valve element 1. This is achieved in the present case in that the gap 12 has increased to a maximum size starting from a complete release of the line cross section 5 through the elongated hole 3, which the sealing element 9 cannot bridge. In actuality, this is achieved by a mechanical stop 17 on the part of the valve housing 4 on which the sealing element 9 contacts with an annular connecting piece 18 and is further prevented from contact on the surface 2.

Due to the lack of contact of the sealing element 9 with the surface 2 starting with the overlap of the valve element 1 with its surface 2 reduced to the dimension 13, the valve element 1 can be moved without friction contact relative to the valve housing 4. Because in this case a flow of fluid is desired between the inner area of the valve element 1 and the line cross section 6, a sealing of the gap by the sealing element 9 is not required in this area.

To prevent tilting of the sealing element 9 while lifting and also while re-establishing the contact on the surface 2 of the valve element 1, the surface 2 of the valve element 1 is provided with ramps 19, 20, 21, and 22 that are each formed laterally relative to the elongated hole 3 on the surface 2 of the valve element 1. Here, the ramps 19 and 20 decrease from the contour 15 and thus the dimension 16 to the base body 14 and thus the dimension 13, while the ramps 21 and 22 then increase again an extent of the valve element 1 in the direction of the valve housing 4 corresponding to the dimension 16. Here, the ramps 19 and 20 begin from the start of the overlap of the elongated hole 3 with the line cross section 6 up to complete release of the same through the elongated hole 3, while the ramps 21 and 22 run starting from the end of the complete release of the line cross section 6 through the elongated hole 3 up to the end of the overlap between the elongated hole 3 and line cross section 6 on the surface 2. The slopes of the ramps 19, 20 and ramps 21 and 22 are to be selected so that they cannot produce a tilting of the sealing element 9 while lifting and also while re-establishing the contact on the surface 2.

In FIG. 3, the control valve is shown for a position of the valve element 1 relative to the valve housing 4 in which the elongated hole 3 does not yet overlap with the line cross section 6. Here it can be seen that the sealing element 9 contacts the surface 2 of the valve element with its sealing surface 11 and thus seals the gap 12 accordingly. This is achieved in that the surface 2 of the valve element 1 is at the dimension 16 in this position and the gap 12 is small enough subsequently so that the sealing element 9 can contact the surface 2. Due to the sealing and also the lack of overlap of the line cross section 6 with the elongated hole 3, in this case a flow of fluid into the line cross section 6 thus to the discharge is prevented.

By the construction of a control valve according to the invention, friction losses of the control valve can be reduced over its working range.

LIST OF REFERENCE NUMBERS

1 Valve element
2 Surface
3 Elongated hole
4 Valve housing
5 Rotational axis
6 Line cross section
7 Fitting
8 Space
9 Sealing element
10 Spring element
11 Sealing surface
12 Gap
13 Dimension
14 Base body
15 Contour
16 Dimension
17 Stop
18 Connecting piece
19 Ramp
20 Ramp
21 Ramp
22 Ramp

The invention claimed is:

1. A control valve for controlling a fluid flow, comprising a valve housing, a valve element that is equipped with an opening and is movable relative to the valve housing, wherein, by moving the valve element, the opening is movable to overlap a line cross section defined by the valve housing, in order to allow a flow of fluid, a sealing element on the valve housing radially surrounding the line cross section that is brought into contact via a sealing surface thereof with a surface of the valve element while bridging a gap that extends between the surface of the valve element and the valve housing in an area of the sealing element, wherein an extent of the gap changes as a function of a movement of the valve element relative to the valve housing and in an area of the overlap of the opening with the line cross section, the gap reaches a maximum extent at which the sealing surface of the sealing element is extended from the surface of the valve element,
wherein the extent of the gap decreases and increases during movement of the valve element relative to the valve housing in a first direction.

2. The control valve according to claim 1, wherein the surface of the valve element has a non-uniform shape that provides for changing the extent of the gap, and an additional contour increasing a dimension of the valve element in a direction of the valve housing is set up on a base body of the valve element away from the at least one opening.

3. The control valve according to claim 2, wherein transitions between different dimensions of the valve element are each constructed in the direction of the valve housing by ramps.

4. The control valve according to claim 3, wherein the ramps are provided on both sides of the opening which is formed as an elongated hole, the ramps decrease to a smaller dimension of the valve element run starting from a beginning of an overlap of the elongated hole with the line cross section up to a complete release of the line cross section, and the ramps increase to a larger dimension of the valve element run starting from an end of the complete release of the line cross section through the elongated hole up to an end of the overlap of the elongated hole with the line cross section.

5. The control valve according to claim 1, wherein the surface of the valve element is equipped with a ball-like surface or is provided as part of a ball-like surface.

6. The control valve according to claim 1, wherein the line cross section is defined by a fitting of the valve housing.

7. The control valve according to claim 6, wherein the fitting and another part of the valve housing define an intermediate space that holds a spring element that pretensions the sealing element in a direction of the valve element, and a mechanical stop for the sealing element is provided that prevents the sealing element from contacting the surface when the gap is at the maximum extent.

8. The control valve according to claim 1, wherein the opening in the valve element is constructed as an elongated hole.

9. A fluid circuit comprising a control valve according to claim 1.

10. The control valve according to claim 1, wherein the non-uniform shape comprises a ramp extending along less than one-quarter of a circumference of valve element.

11. A control valve for controlling a fluid flow comprising a valve housing, a valve element that is equipped with an opening and is movable relative to the valve housing, wherein, by moving the valve element, the opening is movable to overlap a line cross section defined by the valve housing, in order to allow a flow of fluid, a sealing element on the valve housing radially surrounding the line cross section that is brought into contact via a sealing surface thereof with a surface of the valve element while bridging a gap that extends between the surface of the valve element and the valve housing in an area of the sealing element, wherein an extent of the gap changes as a function of a movement of the valve element relative to the valve housing and in an area of the overlap of the opening with the line cross section, the gap reaches a maximum extent at which the sealing surface of the sealing element is extended from the surface of the valve element, wherein the surface of the valve element has a non-uniform shape that provides for changing the extent of the gap, and an additional contour increasing a dimension of the valve element in a direction of the valve housing is set up on a base body of the valve element away from the at least one opening, and wherein the base body is provided as a first ball or as part of a first ball on which ball or on which part of said ball the additional contour is set up in the form of a part of a second ball.

* * * * *